US012698805B2

(12) United States Patent
Gloeckner

(10) Patent No.: US 12,698,805 B2
(45) Date of Patent: Aug. 4, 2026

(54) DRIVE UNIT AND CONNECTION SHAFT FOR A DRIVE UNIT

(71) Applicant: Dr. Fritz Faulhaber GmbH & Co. KG, Schönaich (DE)

(72) Inventor: Robert Gloeckner, Clearwater, FL (US)

(73) Assignee: Dr. Fritz Faulhaber GmbH & Co. KG, Schönaich (DE)

( * ) Notice: Subject to any disclaimer, the term of this patent is extended or adjusted under 35 U.S.C. 154(b) by 404 days.

(21) Appl. No.: 18/140,837

(22) Filed: Apr. 28, 2023

(65) Prior Publication Data

US 2024/0360875 A1      Oct. 31, 2024

(51) Int. Cl.
F16D 1/04          (2006.01)

(52) U.S. Cl.
CPC ...................................... F16D 1/04 (2013.01)

(58) Field of Classification Search
None
See application file for complete search history.

(56) References Cited

U.S. PATENT DOCUMENTS

| | | | | |
|---|---|---|---|---|
| 3,698,750 A | * | 10/1972 | Eastcott | F16D 1/06 403/31 |
| 4,357,137 A | * | 11/1982 | Brown | F16D 1/101 464/159 |
| 4,738,151 A | * | 4/1988 | Russell | F16D 1/0858 403/379.5 |

| | | | | |
|---|---|---|---|---|
| 7,407,440 B2 | * | 8/2008 | White | F16J 15/064 464/902 |
| 2011/0050029 A1 | * | 3/2011 | Baumann | B21J 5/12 310/216.121 |
| 2014/0200086 A1 | * | 7/2014 | Kurokawa | B62D 1/20 464/162 |
| 2018/0355898 A1 | * | 12/2018 | Shirokoshi | F16C 3/02 |
| 2022/0205488 A1 | * | 6/2022 | Geislinger | F16C 3/02 |
| 2023/0366436 A1 | | 11/2023 | Ichida | |

FOREIGN PATENT DOCUMENTS

| | | |
|---|---|---|
| CN | 100381715 | 4/2008 |
| DE | 102016220901 | 4/2018 |
| DE | 102020200351 | 7/2021 |
| EP | 2233747 | 9/2010 |
| WO | WO20110160240 | 12/2011 |

* cited by examiner

*Primary Examiner* — Daniel J Wiley
(74) *Attorney, Agent, or Firm* — ALLEN, DYER, DOPPELT + GILCHRIST, P.A.

(57) ABSTRACT

A drive unit comprising at least one motor, at least one drive shaft and at least one connection shaft, wherein the connection shaft includes at least one receiving recess having a receiving opening at a first end side and is formed closed at a second end side. A first axial portion of the receiving recess has first dimensional tolerance characteristics with respect to the diameter, and the drive shaft is at least partially inserted into the receiving recess. A second axial portion of the receiving recess has second dimensional tolerance characteristics with respect to the diameter, and the first dimensional tolerance characteristics are different from the second dimensional tolerance characteristics, so that a clearance fit or transition fit is formed in the first portion between the drive shaft and the connection shaft and an interference fit is formed in the second portion between the drive shaft and the connection shaft.

13 Claims, 2 Drawing Sheets

DRIVE UNIT AND CONNECTION SHAFT FOR A DRIVE UNIT

FIELD

The invention relates to a drive unit comprising at least one motor, at least one drive shaft and at least one connection shaft. The connection shaft has at least one receiving recess, which has a receiving opening at a first end side and is formed closed at a second end side. At least a first axial portion of the receiving recess has first dimensional tolerance characteristics with respect to the diameter. The drive shaft is at least partially inserted into the receiving recess and connected thereto, in particular in order to transmit torques.

BACKGROUND

Drive units in which a motor is connected to a lead screw are used as linear drives in various applications where precise linear motion is required. The threaded spindle can be, for example, a self-locking trapezoidal threaded spindle or a recirculating ball screw, depending on the requirements for accuracy and load capacity.

Usually, a drive shaft, for example of the motor, and a connection shaft, for example a lead screw, are connected to each other in such a way that the drive shaft is pressed into a receiving recess of the connection shaft and welded to it.

To prevent damage to the components, in particular of a weld during welding, the dimensional tolerance between the drive shaft and the connection shaft must be very accurate, which increases the effort and cost of manufacturing.

The invention is therefore based on the object of providing a drive unit and a connection shaft in which the manufacturing cost is reduced, but at the same time a stable connection is ensured.

SUMMARY

The aforementioned object is solved in a generic drive unit according to the characterizing part of the claims in that at least a second axial portion of the receiving recess has second dimensional tolerance characteristics with respect to the diameter, and in that the first dimensional tolerance characteristics are different from the second dimensional tolerance characteristics. Preferably, the receiving recess is formed as a cylindrical recess.

Due to the different dimensional tolerance characteristics, a clearance fit or a transition fit is formed in the first portion between the drive shaft and the connection shaft, and an interference fit is formed in the second portion between the drive shaft and the connection shaft. The first and second dimensional tolerance characteristics of the receiving recess are selected in particular so that different limit dimensions and thus different fits between the connection shaft and the drive shaft result within the scope of the axial course of the receiving recess.

The different dimensional tolerance characteristics are realized, for example, by different maximum dimensions and minimum dimensions for the dimensional tolerance in the two portions. In the first and second portions, at least the maximum dimensions and/or at least the minimum dimensions are preferably different. The respective maximum dimensions and minimum dimensions are selected in the first portion and in the second portion such that a clearance or transition fit results in the first portion and an interference or press fit results in the second portion. Advantageously, the first portion and the second portion have a matching nominal dimension. In particular, the dimensional tolerance characteristics of the drive shaft are selected such that, in combination with the first and second dimensional tolerance characteristics, at least the aforementioned fits are obtained.

Preferably, the dimensional tolerances in the first portion and in the second portion are in the hundredths range. For example, the dimensional tolerance, i.e. the difference between the maximum dimension and the minimum dimension, is in the first portion about one hundredth and in the second portion about two hundredths.

It is provided that the drive shaft is the motor shaft of the motor, so that the connection shaft is directly attached to the motor shaft of the motor. However, it is also provided that the drive unit has at least one gearbox, and that the drive shaft is the output shaft of a gearbox. In this case, the gearbox is driven on its input side by the motor shaft of the motor and the connection shaft is arranged on the output side of the gearbox.

According to one embodiment, it is particularly preferred that the connection shaft is a lead screw for a linear drive or a shaft adapter.

The provision of different dimensional tolerance characteristics in relation to the diameter ensures an advantageous connection between the drive shaft and the connection shaft, while at the same time reducing the manufacturing effort, since only part of the receiving recess needs to be prepared for an interference fit. The existing interference fit ensures good alignment of the drive shaft in the connection shaft. Furthermore, the forces required for assembly are reduced, as only part of the drive shaft needs to be press-fitted to the connection shaft.

According to one embodiment of the drive unit, the first portion is arranged closer to the first end side than the second portion. In particular, the portion with the clearance- or transition fit is arranged at the receiving opening, while the portion with the interference fit is arranged away from the receiving opening. This allows the drive shaft to be inserted into the receiving recess in a simple manner, since the looser fit must first be stepped through.

Furthermore, the arrangement of the clearance or transition fit in the front part of the receiving recess has the advantage that no air can be trapped or compressed in the receiving recess when the drive shaft is inserted. The trapped air can lead to blow-out effects, particularly during welding, which can cause damage to the weld, which would reduce the quality of the weld. The fact that the interference fit is arranged in the rear part of the receiving recess—in the second portion—means that an interference fit can be achieved which ensures good concentricity characteristics, but nevertheless the air can come out through the first portion.

The manufacturing effort is significantly reduced and, at the same time, an advantageous alignment of the drive shaft to the connection shaft is ensured by the interference fit.

According to a further embodiment of the drive unit, it has also been found advantageous if it is provided that the receiving recess in the first portion has positive limit dimensions and that the receiving recess in the second portion has negative limit dimensions. In particular, a limit dimension of 0 is to be considered a positive limit dimension. In the first portion, the dimensional tolerance of the diameter of the receiving recess deviates to diameters larger than the nominal diameter of the receiving recess. In the second portion, the tolerance deviates only to smaller diameters with respect to the nominal diameter. For example, the limiting dimensions in the first portion are +0.02/+0.00 and in the second portion −0.01/−0.02, especially for a nominal diameter of 1.5 mm.

According to a further embodiment, it has been found to be particularly advantageous in terms of the stability of the connection if it is provided that the first portion is shorter than the second portion. For example, the first portion extends over about 35 to 45% of the axial length of the receiving recess and/or the second portion extends over about 55 to 65% of the axial length of the receiving recess. By making the second portion with the interference fit longer, the stability of the joint is increased.

The stability of the connection can be further increased in particular by providing, according to a further embodiment, that the drive shaft is welded to the connection shaft, in particular in the area of the clearance fit or transition fit. Preferably, the drive shaft is welded to the connection shaft by laser welding. Preferably, a weld seam surrounds the receiving opening. The welding ensures that the interference fit in the second portion is held in position even under alternating tensile and compressive loads during operation. Preferably, the welding merely serves to stabilize the connection, with the main forces being transmitted via the interference fit in the area of the second portion.

This embodiment of the invention is particularly suitable for applications in which a drive shaft is to be connected to an output shaft, for example a lead screw or shaft adapter, but simple pressing is not sufficient and adhesive bonding is not permissible.

In order to simplify in particular the insertion of the drive shaft into the receiving recess, according to a further embodiment of the drive unit it is provided that a circumferential chamfer is formed between the first portion and the second portion. Preferably, the chamfer has an angle of about 45°, so that the drive shaft is advantageously inserted into the second portion during insertion without jamming at the transition region.

The aforementioned object is further solved with a connection shaft according to one of the described embodiments. The connection shaft has a receiving recess in which a first axial portion with first dimensional tolerance characteristics and a second axial portion with second dimensional tolerance characteristics are formed. The first dimensional tolerance characteristics and the second dimensional tolerance characteristics are different from each other. Thus, the invention relates to a connection shaft with a receiving recess which has different dimensional tolerance characteristics in its axial course.

BRIEF DESCRIPTION OF THE DRAWINGS

Further advantageous embodiments of the invention are apparent from the following description of figures and the dependent claims when taken in conjunction with the accompanying drawings wherein:

DETAILED DESCRIPTION

Figure 1:
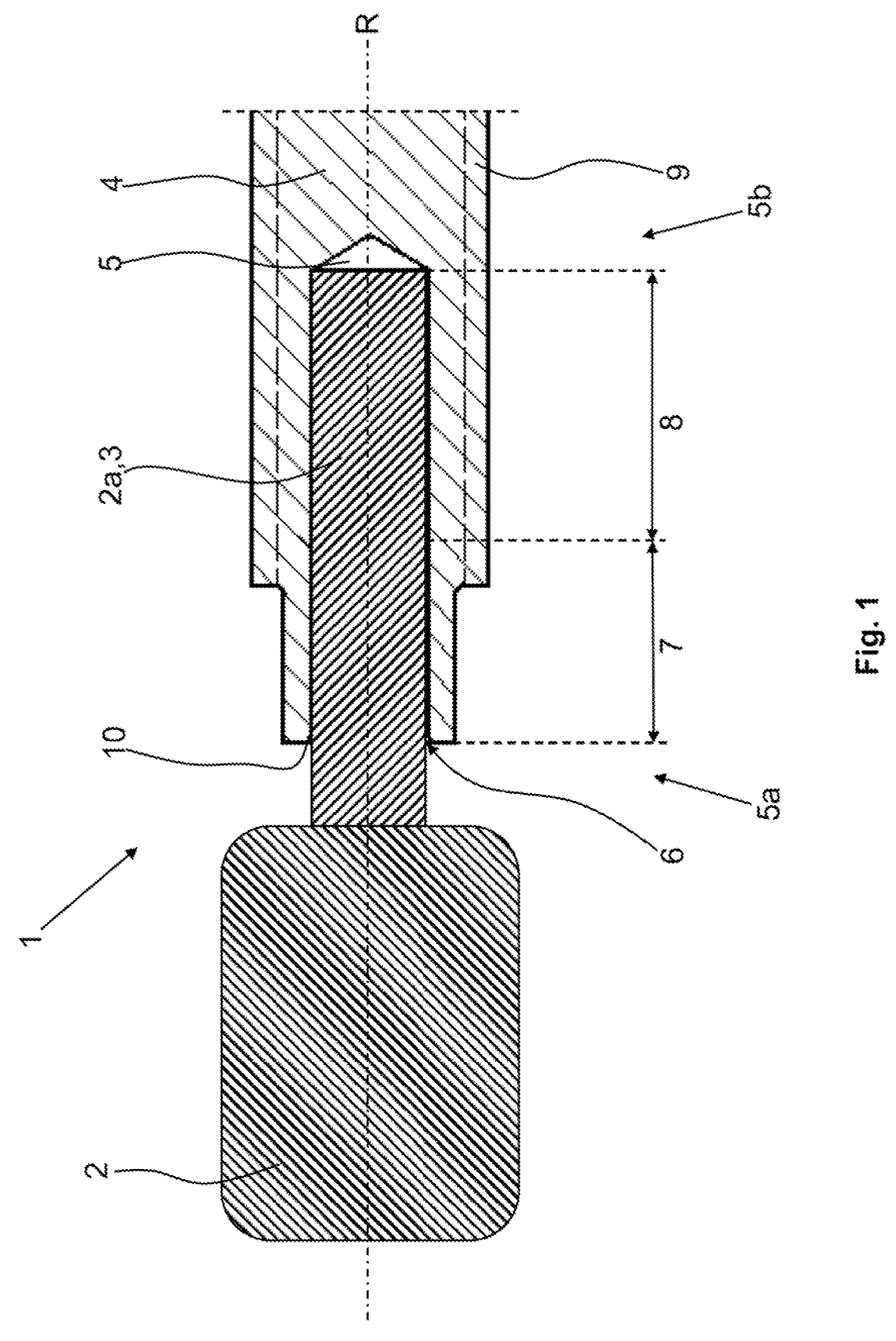
FIG. 1 is an example of a drive unit in section.

In the various figures in the drawing, the same parts are always given the same reference signs.

Regarding the following description, it is claimed that the invention is not limited to the embodiments and thereby not limited to all or several features of described feature combinations, rather each individual partial feature of the/each embodiment is also of importance for the subject matter of the invention detached from all other partial features described in connection therewith for itself and also in combination with any features of another embodiment.

FIG. 1 shows an embodiment of a drive unit 1 in a sectional view along a rotation axis R. The drive unit 1 has a motor 2, which is designed here as a brushless DC motor. Further, the motor 2 has a motor shaft 2a, which in this embodiment is also the drive shaft 3. The drive unit 1 further has a connection shaft 4, which has a receiving recess 5. The receiving recess 5 is substantially cylindrical in shape and extends coaxially with respect to the axis of rotation R. The receiving recess 5 has a receiving opening 6 at a first end side 5a and is closed at a second end side 5b. The receiving opening 6 is the only opening of the receiving recess 5. The drive shaft 3 is at least partially inserted into the receiving recess 5, namely in such a way that the drive shaft 3 extends over almost the entire length of the receiving recess 5.

A first axial portion 7—along the axis of rotation R—of the receiving recess 5 has first dimensional tolerance characteristics with respect to diameter, for example positive limiting dimensions of +0.02/+0.00, preferably at a nominal diameter of 1.5 mm.

The receiving recess 5 has a second axial portion 8 which has second dimensional tolerance characteristics with respect to the diameter, for example −0.01/−0.02, preferably with a nominal diameter of 1.5 mm. The first dimensional tolerance is different from the second dimensional tolerance. As a result, a clearance fit or transition fit is formed in the first portion 7 between the drive shaft 3 and the connection shaft 4, and an interference fit—i.e. a press fit—is formed in the second portion 8 between the drive shaft 3 and the connection shaft 4. Due to the interference fit in the second portion 8, the drive shaft 3 is pressed together with the connection shaft 4, whereby an advantageous power transmission with good concentricity characteristics can be achieved.

The clearance fit or transition fit in the first portion 7 ensures that no damage can be caused to the weld seam by air blowing out of the receiving recess 5 when the drive shaft 3 is inserted and when the drive shaft 3 is welded to the connection shaft 4. In the embodiment according to FIG. 1, the connection shaft 4 is designed as a lead screw and has a circumferential external thread 9 for cooperation with a—not shown—spindle nut.

In the illustrated embodiment, the first portion 7 is arranged closer to the first end side 5a or closer to the receiving opening 6 than the second portion 8. A chamfer 10 with 30°×0.09 is formed at the receiving opening 6.

The first portion 7 extends over about 42% of the length of the receiving recess 5, while the second portion 8 extends over about 58% of the length. The first portion 7 is shorter than the second portion 8.

Figure 2:
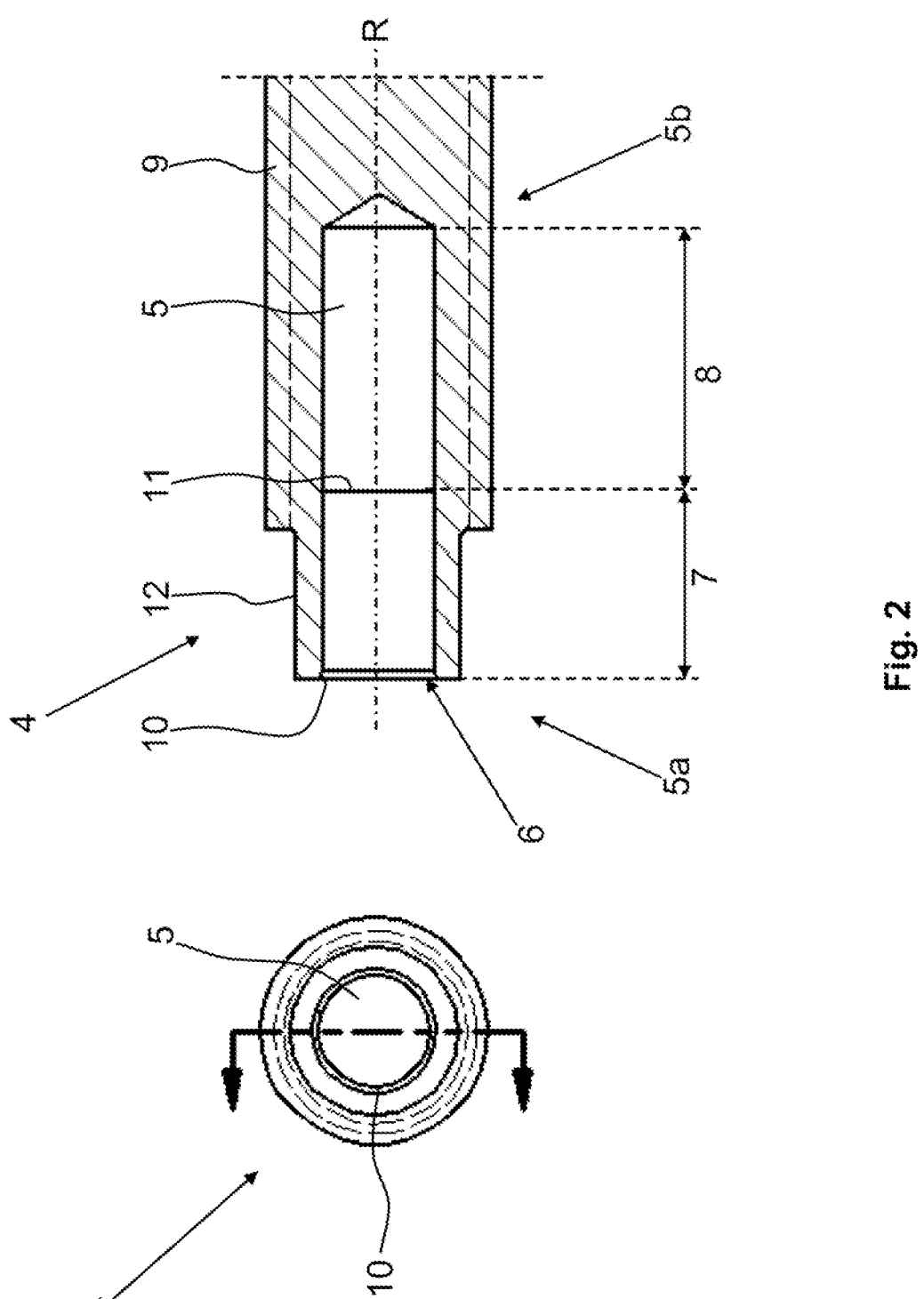
FIG. 2 is a sectional view of a connection shaft of the embodiment as shown in FIG. 1.

FIG. 2 shows an embodiment of a connection shaft 4 for a drive unit 1 according to FIG. 1. The receiving recess 5 extends coaxially to the axis of rotation R and the first portion 7 is arranged closer to the receiving opening 6 than the second portion 8. The chamfer 10 at the receiving opening 6 is formed with 30°×0.09. The first portion 7 is arranged closer to the receiving opening 6 than the second portion 8. Furthermore, a chamfer 11 is formed between the first portion 7 and the second portion 8 at approximately 45°. The connection shaft 4 has a shoulder 12, in which the diameter corresponds approximately to the core diameter of the thread 9, and which partially surrounds the receiving recess 5. A radius is formed in the transition from the shoulder 12 to the thread 9.

The invention can be further described by the following aspects:

Aspect 1. Drive unit (1), comprising at least one motor (2), at least one drive shaft (3) and at least one connection shaft (4), wherein the connection shaft comprises at least one receiving recess (5), wherein the receiving recess (5) comprises a receiving opening (6) at a first end side (5*a*) and is formed closed at a second end side (5*b*), wherein at least a first axial portion (7) of the receiving recess (5) has first dimensional tolerance characteristics with respect to the diameter, and wherein the drive shaft (3) is at least partially inserted into the receiving recess (5), characterized in that at least a second axial portion (8) of the receiving recess (5) has second dimensional tolerance characteristics with respect to the diameter, and in that the first dimensional tolerance characteristics are different from the second dimensional tolerance characteristics, so that a clearance fit or transition fit is formed in the first portion (7) between the drive shaft (3) and the connection shaft (4) and an interference fit is formed in the second portion (8) between the drive shaft (3) and the connection shaft (4).

Aspect 2. Drive unit (1) according to aspect 1, characterized in that the drive shaft (3) is the motor shaft (2*a*) of the motor (2), or in that the drive shaft (3) is the output shaft of a gearbox.

Aspect 3. Drive unit (1) according to aspect 1 or 2, characterized in that the connection shaft (4) is a lead screw or a shaft adapter.

Aspect 4. Drive unit (1) according to any of aspects 1 to 3, characterized in that the first portion (7) is arranged closer to the first end side (5*a*) than the second portion (8).

Aspect 5. Drive unit (1) according to any one of aspects 1 to 4, characterized in that the receiving recess (5) in the first portion (7) has positive limit dimensions, and in that the receiving recess (5) in the second portion (8) has negative limit dimensions.

Aspect 6. Drive unit (1) according to any one of aspects 1 to 5, characterized in that the first portion (7) is shorter than the second portion (8).

Aspect 7. Drive unit (1) according to any one of aspects 1 to 6, characterized in that the drive shaft (3) is welded to the output shaft, in particular in the region of the clearance fit or transition fit.

Aspect 8. Drive unit (1) according to any of aspects 1 to 7, characterized in that a circumferential chamfer (11) is formed between the first portion (7) and the second portion (8).

Aspect 9. A connection shaft (4), in particular for a drive unit (1) according to one of aspects 1 to 8, wherein the connection shaft (4) has at least one receiving recess (5), wherein the receiving recess (5) has a receiving opening (6) at a first end side (5*a*) and is formed closed at a second end side, characterized in that that at least a first axial portion (7) of the receiving recess (5) is formed with first dimensional tolerance characteristics, that at least a second axial portion (8) of the receiving recess (5) is formed with second dimensional tolerance characteristics, and that the first dimensional tolerance characteristics and the second dimensional tolerance characteristics are different.

Aspect 10. Connection shaft (4) according to aspect 9, characterized in that the first portion (7) is arranged closer to the first end side (5*a*) than the second portion (8).

Aspect 11. Connection shaft (4) according to aspect 9 or 10, characterized in that the receiving recess (5) in the first portion (7) has positive limit dimensions, and that the receiving recess (5) in the second portion (8) has negative limit dimensions.

Aspect 12. Connection shaft (4) according to any one of aspects 9 to 11, characterized in that the first portion (7) is shorter than the second portion (8).

Aspect 13. Connection shaft (4) according to any one of claims 9 to 12, characterized in that a circumferential chamfer (11) is formed between the first portion (7) and the second portion (8).

The invention is not limited to the embodiments shown and described, but also includes all embodiments having the same effect in the sense of the invention. It is expressly emphasized that the embodiments are not limited to all features in combination, rather each individual sub-feature may also have inventive significance in isolation from all other sub-features. Furthermore, the invention has not yet been limited to the combination of features defined in claim 1 either, but can also be defined by any other combination of certain features of all the individual features disclosed as a whole. This means that in principle virtually any individual feature of claim 1 can be omitted or replaced by at least one individual feature disclosed elsewhere in the application.

LIST OF REFERENCE SIGNS

1 Drive unit
2 Motor
2*a* Motor shaft
3 Drive shaft
4 Connection shaft
5*a* First end side
5 Receiving recess
6 Receiving opening
7 First portion
8 Second portion
9 Thread
10 Chamfer
11 Chamfer
12 Shoulder
R Rotation axis

The invention claimed is:

1. A drive unit comprising at least one motor, at least one drive shaft and at least one connection shaft, wherein the connection shaft comprises at least one receiving recess, wherein the receiving recess comprises a receiving opening at a first end side and is closed at a second end side, wherein at least a first axial portion of the receiving recess has first dimensional tolerance characteristics with respect to the diameter, and wherein the drive shaft is at least partially inserted into the receiving recess, characterized in that at least a second axial portion of the receiving recess has second dimensional tolerance characteristics with respect to the diameter, and in that the first dimensional tolerance characteristics are different from the second dimensional tolerance characteristics so that a clearance fit or transition fit is formed in the first portion between the drive shaft and the connection shaft and an interference fit is formed in the second portion between the drive shaft and the connection shaft, wherein the first axial portion with the clearance or transition fit is arranged at the receiving opening.

2. The drive unit according to claim 1, characterized in that the drive shaft is the motor shaft of the engine, or that the drive shaft is the output shaft of a gearbox.

3. The drive unit according to claim 1, characterized in that the connection shaft is a lead screw or shaft adapter.

4. The drive unit according to claim 1, characterized in that the first portion is arranged closer to the first end side than the second portion.

5. The drive unit according to claim 1, characterized in that the receiving recess in the first portion has positive limit dimensions, and that the receiving recess in the second portion has negative limit dimensions.

6. The drive unit according to claim 1, characterized in that the first portion is shorter than the second portion.

7. The drive unit according to claim 1, characterized in that the drive shaft is welded to the connection shaft.

8. The drive unit according to claim 1, characterized in that a circumferential chamfer is formed between the first portion and the second portion.

9. A connection shaft having at least one receiving recess, the receiving recess having a receiving opening on a first end side and being closed on a second end side, characterized in that at least a first axial portion of the receiving recess is formed with first dimensional tolerance characteristics, that at least a second axial portion of the receiving recess is formed with second dimensional tolerance characteristics, and that the first dimensional tolerance characteristics and the second dimensional tolerance characteristics are different, wherein the first axial portion, which is designed to form a clearance or transition fit is arranged at the receiving opening.

10. The connection shaft according to claim 9, characterized in that the first portion is arranged closer to the first end side than the second portion.

11. The connection shaft according to claim 9, characterized in that the receiving recess in the first portion has positive limit dimensions, and that the receiving recess in the second portion has negative limit dimensions.

12. The connection shaft according to claim 9, characterized in that the first portion is shorter than the second portion.

13. The connection shaft according to claim 9, characterized in that a circumferential chamfer is formed between the first portion and the second portion.

* * * * *